UNITED STATES PATENT OFFICE.

NOAK VICTOR HYBINETTE, OF CHRISTIANIA, NORWAY.

PROCESS OF EXTRACTING COPPER FROM OXIDIZED ORES.

1,233,580.

Specification of Letters Patent. Patented July 17, 1917.

No Drawing. Application filed May 22, 1913. Serial No. 769,210.

*To all whom it may concern:*

Be it known that I, NOAK VICTOR HYBINETTE, a subject of the King of Norway, residing at Christiana, Norway, have invented certain new and useful Improvements in Processes of Extracting Copper from Oxidized Ores; and I do hereby declare the following to be a full, clear, and exact description of the invention, such as will enable others skilled in the art to which it appertains to make and use the same.

This invention has for its object a process of extracting copper from oxidized ores.

When oxidized copper ores are dissolved in sulfuric acid there is very often large quantities of iron present in the ore, in such form as to be dissolved at the same time as the copper. This is very often the case and such ores can not be successfully extracted by leaching with sulfuric acid and electrolysis. It is therefore necessary to reduce the iron compounds to the ferrous state, and when the ore does not contain any reducing compound, and when sulfurous acid is too expensive to use, the electrolysis has been found impracticable.

I have now found, that such reduction can be accomplished without the aid of sulfur compounds, namely by heating the ore to a red heat in the presence of some carbonaceous material such as generator gas, sawdust, coaldust etc. The reduction of the copper compounds to metal is thereby accomplished and care need only be taken that the copper is not again oxidized by the ore coming in contact with air before it is cooled. Such reduced ore is then used to reduce the solution in such a way, that ferric sulfate and metallic copper form ferrous sulfate and sulfate of copper.

If the reduction is carried out at the lowest possible heat the metallic copper formed is so finely divided and spongy, that it is easily soluble in even a weak solution of acid ferric sulfate. If on the contrary the temperature has been too high, the metallic copper is denser and therefore not so easily dissolved. If the reduction should be incomplete, this does not interfere with the success of the process, because the oxid of copper left behind is always easily soluble in the acid present in the solution. Whether all the ore or only a small part thereof need be reduced before leaching depends therefore upon the iron contents of the ore or the amount of reduction to be accomplished. This process does also serve another purpose namely to make other oxids such as alumina and magnesia less apt to dissolve at the same time as the copper. They are made more insoluble by the heating, and the ferric solution dissolving the metallic copper need not contain so much acid as when oxid is dissolved in acid. It is obvious that the electrolyte will be regenerated after electrolysis by passing it alternately through such reduced ore and through unreduced ore.

I claim:

1. The process of extracting copper from oxidized ores thereof containing iron by leaching a portion of the ore with sulfuric acid, electrolytically depositing copper, reducing another portion of the ore and reducing the ferric compounds of the electrolyte by treating the same with the reduced ore.

2. In the process of extracting copper from oxidized ores containing iron which dissolves with the copper, the step of reducing such dissolved iron from the ferric to the ferrous condition before electrolysis by passing the solution through a quantity of ore which has previously been reduced by heating with carbonaceous matter at a low temperature to obtain the copper in a spongy state.

In testimony that I claim the foregoing as my invention, I have signed my name in presence of two subscribing witnesses.

NOAK VICTOR HYBINETTE.

Witnesses:
M. E. GUTTORMSEN,
RUTH LINDSTRÖM.